US005756984A

United States Patent [19]
Kobayashi

[11] Patent Number: 5,756,984
[45] Date of Patent: May 26, 1998

[54] HANDY SCANNER

[75] Inventor: Masayuki Kobayashi, Mishima, Japan

[73] Assignee: Kabushiki Kaisha TEC, Shizuoka, Japan

[21] Appl. No.: 738,718

[22] Filed: Oct. 28, 1996

[30] Foreign Application Priority Data

Oct. 31, 1995 [JP] Japan .................................. 7-283021

[51] Int. Cl.⁶ .................................................. G06F 7/10
[52] U.S. Cl. .................................... 235/472; 235/462
[58] Field of Search ................................ 235/462, 472

[56] References Cited

U.S. PATENT DOCUMENTS 5,656,804 8/1997 Barkan et al. ........................ 235/472

*Primary Examiner*—Harold Pitts
*Attorney, Agent, or Firm*—Frishauf, Holtz, Goodman, Langer & Chick

[57] ABSTRACT

A handy scanner removably held by a scanner holder is composed of an LED unit for illuminating a bar code affixed to an article, a light-receiving unit for producing an output signal corresponding to reflected light from the bar code, and a processing section for obtaining bar code information from the output signal produced by the light-receiving unit. Particularly, the processing section includes a comparator for determining whether the handy scanner is held by the holder, and a control circuit for turning on the LED unit when it is detected by the comparator that the handy scanner is removed from the scanner holder and turning off the LED unit when the bar code information has not been obtained within a predetermined time after turning on the LED unit.

16 Claims, 3 Drawing Sheets

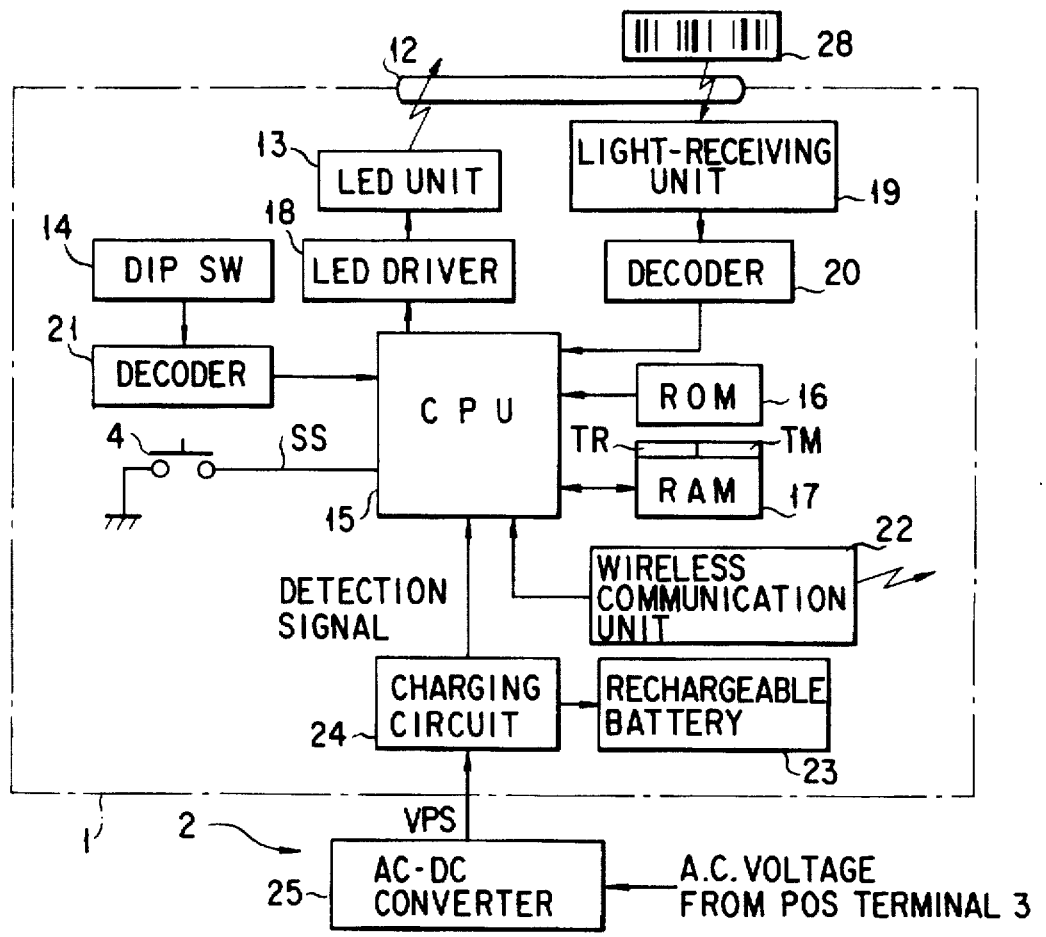
F I G. 3
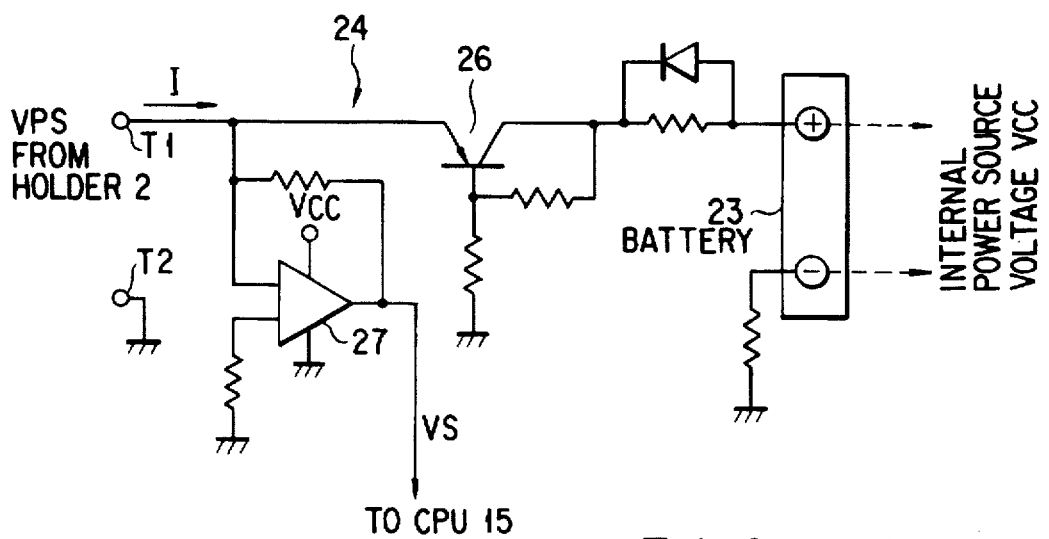
F I G. 4

HANDY SCANNER

BACKGROUND OF THE INVENTION

1. Field of the Invention

The present invention relates to a handy scanner which optically reads a bar code and, more particularly, to a handy scanner which transmits information of the read bar code by wireless.

2. Description of the Related Art

In a large retail store such as a supermarket, handy scanners called wireless touch scanners are used. In general, a handy scanner of this type optically reads a bar code and transmits the read bar code information by wireless. This bar code information is received by a repeater and electrically input to a Point Of Sales (POS) terminal for processing the bar code information. The handy scanner is operated by a power supplied from a built-in battery so that the handy scanner need not be connected to the POS terminal through a power supply cable. The built-in battery is charged while the handy scanner is held by a scanner holder, and always ready to use.

At the time of reading a bar code, the operator picks up the handy scanner from the scanner holder, brings a read window of the handy scanner close to the bar code until the read window comes in tight contact with the bar code, and depresses a read switch of the handy scanner. Upon operation of the read switch, the handy scanner turns on an LED unit for irradiating illumination light on the bar code through the read window. Light reflected by the bar code is supplied via the read window to a light-receiving unit of the handy scanner. The handy scanner obtains bar code information from an output signal which is produced in accordance with the received light by the light-receiving unit, and causes a communication unit to transmit this bar code information by wireless.

The built-in battery is mainly consumed to drive the LED unit. Thus, continuous driving of the LED unit results in that the built-in battery is completely discharged within a relatively short period of time. If the operator forgets to put the handy scanner back to the scanner holder, there is a possibility that it becomes unusable while reading bar codes to be purchased by a customer.

The conventional handy scanner, the power consumption is reduced by turning off the LED unit except while the read switch is kept depressed. However, since the cumbersome read switch operation is necessary every time a bar code is read, this handy scanner is poor in operability.

SUMMARY OF THE INVENTION

It is an object of the present invention to provide a handy scanner which can reduce the power consumption without degrading the operability.

The above object can be attained by a handy scanner removably held by a holder, comprising an illumination light source for illuminating a symbol affixed to an article, a light-receiving section for producing an output signal corresponding to reflected light from the symbol, and a processing section for obtaining symbol information from the output signal produced by the light-receiving section, wherein the processing section includes a monitor circuit for determining whether the handy scanner is held by the holder, and a control circuit for turning on the illumination light source when it is detected by the monitor circuit that the handy scanner is removed from the holder and turning off the illumination light source when the symbol information has not been obtained within a predetermined time after turning on the illumination light source.

With this handy scanner, the illumination light source is turned on upon removing the handy scanner from the holder. When the illumination light is reflected by the symbol affixed to the article and received by the light-receiving section, the light-receiving section produces an output signal corresponding to the reflected light. The processing section reads the symbol information from the output signal produced by the light-receiving section. Therefore, the operator need not perform a switching operation to read the symbol information. Since the illumination light source is turned off when the symbol information has not been obtained within the predetermined time after turning on the illumination light source, power which is wastefully consumed by the illumination light source is reduced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a block diagram showing the control circuit of the handy scanner shown in FIG. 2;

FIG. 4 is a circuit diagram showing the arrangement of a charging circuit shown in FIG. 3.

DETAILED DESCRIPTION OF THE PREFERRED EMBODIMENTS

A handy scanner system according to an embodiment of the present invention will now be described with reference to the accompanying drawings.

Figure 1:
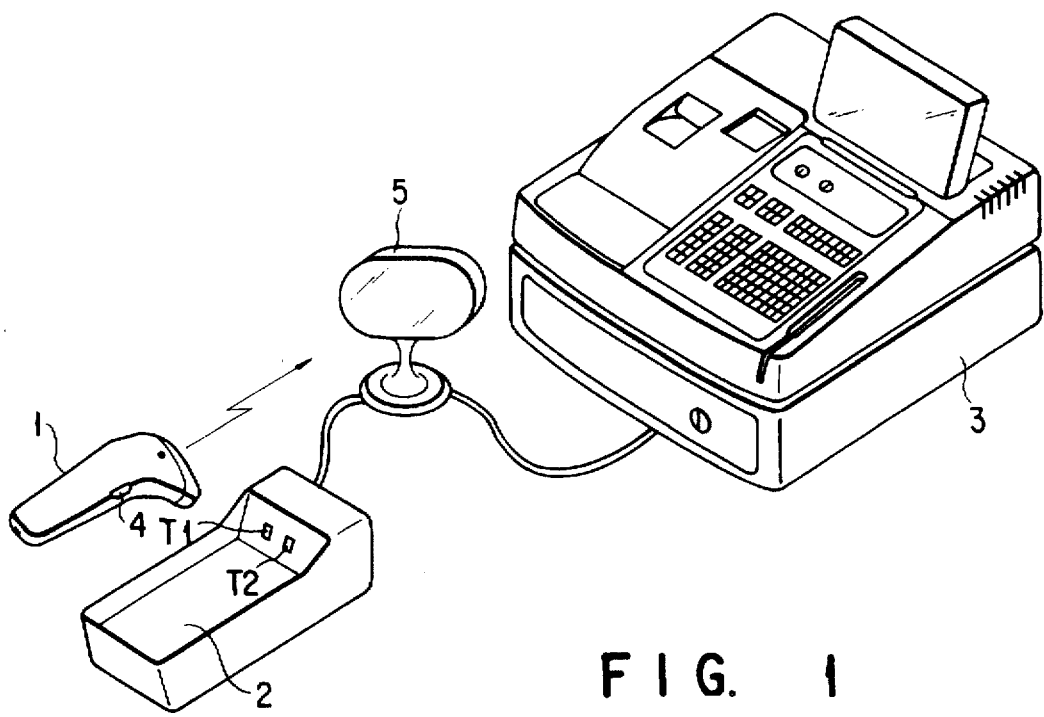
FIG. 1 is a view showing the outer appearance of a handy scanner system according to an embodiment of the present invention.

FIG. 1 shows the outer appearance of this handy scanner system. This handy scanner system is comprised of a handy scanner 1 which optically reads a bar code affixed to an article and transmits information of the read bar code by wireless, a scanner holder 2 which removably holds the handy scanner 1 put thereon, a Point Of Sales (POS) terminal 3 which processes the bar code information, and a repeater 5 which receives the bar code information transmitted from the handy scanner 1 by wireless and electrically inputs the information to the POS terminal 3. The scanner holder 2 is connected to the POS terminal 3 by a cable, and the repeater 5 is inserted in the cable and located near the POS terminal 3.

Figure 2:
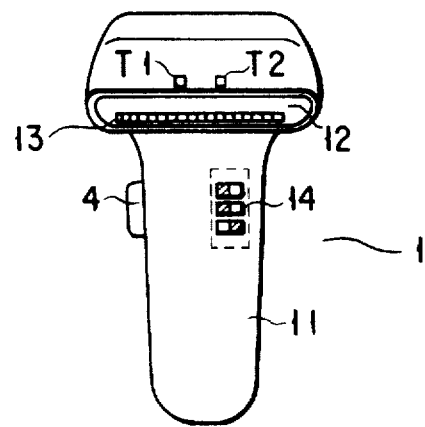
FIG. 2 is a view showing the details of the handy scanner shown in FIG. 1.

FIG. 2 shows the details of the handy scanner 1 shown in FIG. 1. As shown in FIG. 2, the handy scanner 1 has a read switch 4 which is operated at the time of reading the bar code, a grip 11 to be held by a hand of an operator, a read window 12 which is made close to the bar code until it is almost brought into tight contact with the bar code, an LED unit 13 serving as an illumination light source for illuminating the bar code via the read window 12, and a DIP switch 14 for setting the emission limit time of the LED unit 13. The read window 12 is arranged at the distal end of the scanner body. The read switch 4 is arranged on the side surface of the scanner body. The DIP switch 14 is arranged on the lower surface of the scanner body.

FIG. 3 shows the control circuit of the handy scanner 1 shown in FIG. 2. This control circuit is composed of a CPU 15, a ROM 16, a RAM 17, an LED driver 18, a light-receiving unit 19, a bar code decoder 20, a switch decoder 21, a wireless communication unit 22, a rechargeable battery 23, and a charging circuit 24. The CPU 15 is connected to the read switch 4, the ROM 16, the RAM 17, the LED driver 18, the bar code decoder 20, the switch decoder 21, the wireless communication unit 22, and the charging circuit 24. The DIP switch 14 is connected to the switch decoder 21. The LED unit 13 is connected to the LED driver 18. The light-receiving unit 19 is connected to the bar code decoder 20. The rechargeable battery 23 is connected to the charging circuit 24 so that the rechargeable battery 23 is charged by the charging circuit 24 to supply a power supply voltage VCC to all the circuit components of the handy scanner 1.

The CPU 15 performs processing of controlling the entire operation of the handy scanner 1. The ROM 16 stores fixed data such as a control program of the CPU 15. The RAM 17 temporarily stores data input to and output from the CPU 15. The RAM 17 includes areas serving as a register TR for storing emission limit time of the LED unit 13 and a timer counter TM for storing time data which changes from the emission limit time preset as an initial value. To start the timer counter TM after presetting the emission limit time of the LED unit 13, the CPU 15 permits an interruption periodically requested from an internal timepiece circuit formed therein. The CPU 15 responds to each interruption in order to update the time data stored in the timer counter TM at a constant rate and detects an elapse of the emission limit time when the time data stored in the timer counter TM reaches "0", for example. The LED driver 18 drives the LED unit 13. The LED unit 13 is constituted by a plurality of light-emitting elements arranged in a row, and emits illumination light to be irradiated on a bar code via the read window 12. The light-receiving unit 19 is constituted by a line CCD, and produces an output signal corresponding to light reflected by the bar code and supplied via the read window 12. The bar code decoder 20 decodes the output signal produced by the light-receiving unit 19. The CPU 15 reads information of the bar code obtained as a decoding result from the bar code decoder 20 and supplies the bar code information to the wireless communication unit 22. The wireless communication unit 22 transmits the bar code information supplied from the CPU 15 to the repeater 5 in the form of an infrared signal. The repeater 5 receives the infrared signal and supplies the bar code information obtained from this infrared signal to the POS terminal 3. The DIP switch 14 is operated to set a binary code of, e.g., three bits to select the emission limit time of the LED unit 13. The switch decoder 21 decodes the binary code set as a state of the DIP switch 14. The CPU 15 determines the emission limit time of the LED unit 13 in accordance with the decoding result from the switch decoder 21, and stores this emission limit time into the register TR of the RAM 17.

The scanner holder 2 has an AC-DC converter 25 for converting an AC voltage supplied from the POS terminal 3 through the cable into a DC charging voltage VPS. This DC charging voltage from the AC-DC converter 25 is supplied to the charging circuit 24 of the handy scanner 1 through connectors T1 and T2 each of which is connected when the handy scanner 1 is placed on the scanner holder 2. The charging circuit 24 charges the rechargeable battery 23 with the DC charge voltage VPS.

FIG. 4 shows the arrangement of the charging circuit 24 shown in FIG. 3. As shown in FIG. 4, the charging circuit 24 includes a charge current limiting transistor 26 serving as a main component, and charges the battery 23 while the handy scanner 1 is held by the scanner holder 2, thereby causing the handy scanner 1 to be readily available for reading a bar code. A comparator 27 is located at a stage preceding to the transistor 26, and monitors a charge current I supplied therethrough to the rechargeable battery 23. The charge current I does not flow in a condition where the handy scanner 1 is not connected to the scanner holder 2, and flows in a condition where the handy scanner 1 is connected to the scanner holder 2. The comparator 27 produces an output signal which is set to a low level when an absence of the charge current I is detected and to a high level when a presence of the charge current I is detected. This output signal is supplied to the CPU 15 as a detected condition signal VS.

Figure 5:
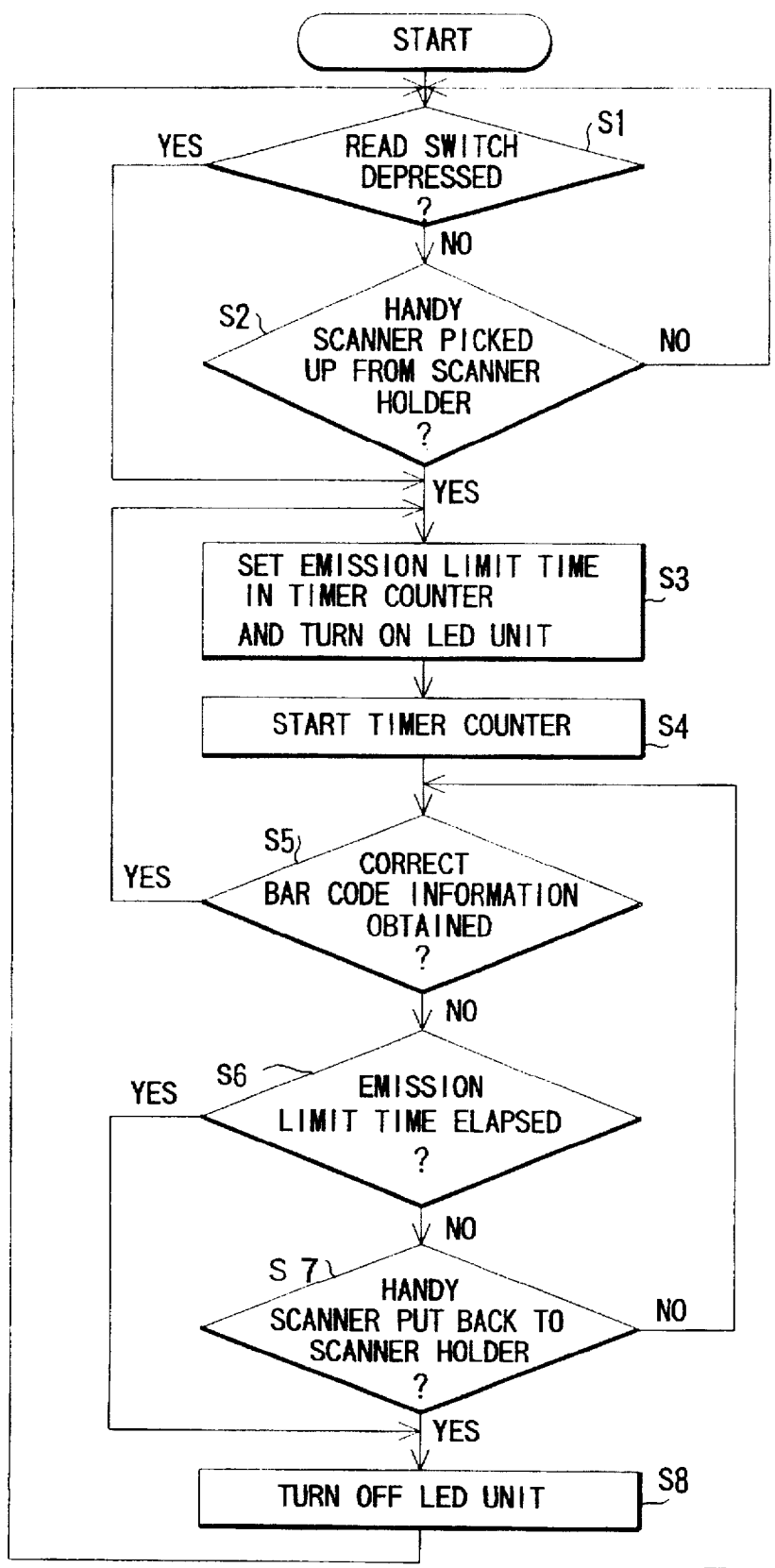
FIG. 5 is a flowchart for explaining the control operation of the control circuit shown in FIG. 3.

FIG. 5 shows the control operation of the control circuit shown in FIG. 3. Upon supply of the power source voltage VCC from the rechargeable battery 23, the CPU 15 execute the control program to perform the control operation. The DIP switch 14 is previously operated to set the emission limit time of the LED unit 13. If the state of the DIP switch 14 is changed thereafter, the CPU 15 responds to this change and executes an interruption process of updating the emission limit time stored in the register TR.

When the control operation of FIG. 5 begins, the CPU 15 checks the switch signal SS, in step S1, to detect that the read switch 4 is depressed, and the detected condition signal VS, in step S2, to detect that the handy scanner 1 is picked up from the scanner holder 2. Steps S1 and S2 are repeatedly executed when the read switch 4 is not operated and the handy scanner 1 is not picked up. Step S3 is executed when the read switch 4 is operated or the handy scanner 1 is picked up. In step S3, the CPU 15 stores the emission limit time of the LED unit 13 read from the register TR of the RAM 17 into the timer counter TM, and turns on the LED unit 13 by using the LED driver 18.

After turning on the LED unit 13, the CPU 15 permits, in step S4, the timer counter TM to start. Thereafter, the CPU 15 checks, in step S5, whether correct information of a bar code has been obtained. At this time, it is confirmed from the check-digit of the bar code that the bar code information is correct. The CPU 15 causes the correct bar code information to be transmitted from the wireless communication unit 22 to the repeater 5 in the form of an infrared signal, and then executes step S3 again. This means that the emission limit time of the LED unit 13 is restored in the timer counter TM to continue driving of the LED unit 13.

If correct bar code information is not obtained in step S5, it is checked in step S6 whether the emission limit time has been elapsed. When the emission limit time has not been elapsed, it is checked in step S7 whether the handy scanner 1 is put back to the scanner holder 2. Step S5 is executed again when the handy scanner 1 is not put back to the scanner holder 2.

When it is detected that the emission limit time has been elapsed or the handy scanner is put back to the scanner holder 2, the LED unit 13 is turned off in step S8. Thereafter, step S1 is executed again.

In the embodiment described above, the handy scanner 1 is connected to and held by the scanner holder 2 before it is used to read a bar code 28. During the period in which the handy scanner 1 is connected to the scanner holder 2, the rechargeable battery 23 of the handy scanner 1 is charged by power supplied from the scanner holder 2. When the operator picks up the handy scanner 1 from the scanner holder 2, this is determined from a change in the detected condition signal VS, and the LED unit 13 is driven for a period of the emission limit time set in the timer counter TM. The operator set the read window 12 of the handy scanner 1 close to the bar code 28 so that it is almost brought into tight contact with the bar code 28. illumination light from the LED unit 13 is reflected by the bar code 28, and received by the light-receiving unit 19. The light-receiving unit 19 produces an output signal corresponding to the reflected light. The bar code decoder 20 obtains bar code information by decoding the output signal of the light-receiving unit 19. The bar code information is transmitted to the repeater 5 by wireless. Since the time data stored in the timer counter TM is reset to an initial value for each time the bar code information is obtained, driving of the LED unit 13 is continued for another period of the emission limit time. Therefore, the operator can use the handy scanner 1 to perform an operation of successively reading bar codes affixed to articles.

When no bar code information is obtained after the emission limit time has been elapsed or when the handy scanner 1 is put back to the scanner holder 2, the LED unit 13 is turned off to reduce the power consumption of the handy scanner 1.

According to the scanner system of the above-mentioned embodiment, the LED unit 13 is automatically turned on by picking up the handy scanner 1 from the scanner holder 2. No particular switch operation is required for reading a bar code 28. Further, When bar code information is obtained within the emission limit time, this limit time is restored in the timer counter TM. Therefore, driving of the LED unit 13 and reading of a bar code 28 can be continued. Meanwhile, it is not necessary to repeat a particular switch operation for each bar code 28. Thus, the operability can be improved when the handy scanner 1 is used for sequentially reading a plurality of bar codes. On the other hand, the LED unit 13 is automatically turned off when no bar code information has been obtained within the emission limit time. Therefore, power supplied from the rechargeable battery 23 can be saved. Moreover, the LED unit 13 is also automatically turned off when the handy scanner 1 has been put back to the scanner holder 2 within the emission limit time. This will increase an amount of power to be saved.

In the aforementioned embodiment, the emission limit time is set by using the DIP switch 14. Instead, the handy scanner 1 can be used to set the emission limit time if there is provided a bar code representing time data of the emission limit time. When the bar code is read by using the handy scanner 1, a default value of the emission limit time stored in the register TR is change based on a result of reading.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A handy scanner removably held by a holder, comprising:
   an illumination light source for illuminating a symbol affixed to an article;
   a light-receiving section for producing an output signal corresponding to reflected light from the symbol; and
   a processing section for obtaining symbol information from the output signal produced by said light-receiving section;
   wherein said processing section includes a monitor circuit for determining whether said handy scanner is held by said holder, and a control circuit for turning on said illumination light source when it is detected by said monitor circuit that said handy scanner is removed from said holder and turning off said illumination light source when the symbol information has not been obtained within a predetermined time after turning on said illumination light source.

2. A handy scanner according to claim 1, wherein said control circuit includes timer means for starting when said illumination light source is turned on to detect that the predetermined time has been elapsed thereafter, and timer control means for restarting said timer means each time the symbol information is obtained.

3. A handy scanner according to claim 2, wherein said timer control means includes limit time changing means for changing an emission limit time set in said timer means as the predetermined time.

4. A handy scanner according to claim 1, wherein said control circuit is arranged for turning off said illumination light source when it is also detected by said monitor circuit that said handy scanner is put back to said holder.

5. A handy scanner according to claim 1, further comprising a rechargeable battery which serves as a power source for said illumination light source, said light-receiving section, and said processing section.

6. A handy scanner according to claim 5, wherein said holder includes power supplying means for supplying power to charge said rechargeable battery while said handy scanner is held by the holder, and said control circuit includes charging means for charging said rechargeable battery with the power supplied from said power supplying means.

7. A handy scanner according to claim 6, wherein said monitor circuit includes current monitor means for monitoring a charging current supplied to said rechargeable battery to determine from a presence and an absence thereof whether said handy scanner has been held by or removed from said holder.

8. A handy scanner according to claim 1, wherein said processing section includes transmitting means for transmitting the obtained symbol information by wireless.

9. A method of controlling a handy scanner which is removably held by a holder and comprises an illumination light source for illuminating a symbol affixed to an article, a light-receiving section for producing an output signal corresponding to reflected light from the symbol, and a processing section for obtaining symbol information from the output signal produced by said light-receiving section, said method comprising the steps of:
   determining whether said handy scanner is held by said holder;
   turning on said illumination light source when it is detected by said monitor circuit that said handy scanner is removed from said holder; and
   turning off said illumination light source when the symbol information has not been obtained within a predetermined time after turning on said illumination light source.

10. A method according to claim 9, wherein said turning-off step includes a step of detecting that the predetermined time has been elapsed after said illumination light source is turned on, by using timer means for starting when said illumination light source is turned on, and a step of restarting said timer means each time the symbol information is obtained.

11. A method according to claim 10, wherein said timer restarting step includes a step of changing an emission limit time set in said timer means as the predetermined time.

12. A method according to claim 9, wherein said turning-off step includes a step of turning off said illumination light source when it is also detected in said monitoring step that said handy scanner is put back to said holder.

13. A method according to claim 9, wherein said handy scanner comprises a rechargeable battery which serves as a power source for said illumination light source, said light-receiving section, and said processing section.

14. A method according to claim 13, wherein said holder includes power supplying means for supplying power to charge said rechargeable battery while said handy scanner is held by the holder, and said control circuit includes charging means for charging said rechargeable battery with the power supplied from said power supplying means.

15. A method according to claim 14, wherein said monitoring step includes a step of monitoring a charging current supplied to said rechargeable battery to determine from a presence and an absence thereof whether said handy scanner has been held by or removed from said holder.

16. A handy scanner according to claim 9, wherein said processing section includes transmitting means for transmitting the obtained symbol information by wireless.

* * * * *